United States Patent
Castagna et al.

(10) Patent No.: US 11,985,256 B2
(45) Date of Patent: May 14, 2024

(54) ELECTRONIC SYSTEM FOR AUTOMATIC PROVISIONING OF LIMITED-TRANSFERABILITY ELECTRONIC DIGITAL CERTIFICATES ASSOCIATED WITH EVENTS

(71) Applicant: BANK OF AMERICA CORPORATION, Charlotte, NC (US)

(72) Inventors: Brandon Matthew Castagna, Charlotte, NC (US); Tiffany Ashley Wan, New York, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 258 days.

(21) Appl. No.: 17/382,769

(22) Filed: Jul. 22, 2021

(65) Prior Publication Data
US 2023/0029360 A1 Jan. 26, 2023

(51) Int. Cl.
H04L 9/32 (2006.01)
(52) U.S. Cl.
CPC .................. *H04L 9/3263* (2013.01)
(58) Field of Classification Search
None
See application file for complete search history.

(56) References Cited

U.S. PATENT DOCUMENTS

| | | | |
|---|---|---|---|
| 5,521,984 A | 5/1996 | Denenberg et al. |
| 7,711,647 B2 | 5/2010 | Gunaseelan et al. |
| 9,135,766 B2 | 9/2015 | Lee et al. |
| 9,875,510 B1 | 1/2018 | Kasper |
| 10,140,470 B2 | 11/2018 | Kurian et al. |
| 10,387,703 B2 | 8/2019 | Soborski |
| 10,417,217 B2 | 9/2019 | Pierce et al. |
| 10,574,464 B2 | 2/2020 | Lancashire et al. |
| 10,972,279 B2 | 4/2021 | Sethi et al. |
| 11,023,455 B2 | 6/2021 | Qiu et al. |
| 11,042,871 B2 | 6/2021 | Snow |
| 11,075,891 B1 | 7/2021 | Long et al. |
| 11,087,214 B2 | 8/2021 | Katz et al. |
| 11,093,558 B2 | 8/2021 | Androulaki et al. |
| 2010/0313037 A1 | 12/2010 | Ward |
| 2015/0379321 A1 | 12/2015 | Soborski |

(Continued)

*Primary Examiner* — Brandon Hoffman
(74) *Attorney, Agent, or Firm* — Moore & Van Allen PLLC; Lauren M. Stokes

(57) ABSTRACT

Systems, computer program products, and methods are described herein for automatic provisioning of limited-transferability electronic certificates associated with events. The present invention may be configured to receive event data including event information associated with an event, receive user data including user information associated with a user, where the user is associated with the event, and generate, based on the event data and the user data, an electronic digital certificate. The present invention may be configured to store the electronic digital certificate on a distributed ledger and generate, on the distributed ledger, a smart contract associated with the electronic digital certificate that prevents transfer of the electronic digital certificate. The present invention may be configured to record, on the distributed ledger, that the user owns the electronic digital certificate and provide, to a user device associated with the user, a notification that the user owns the electronic digital certificate.

20 Claims, 3 Drawing Sheets

(56) References Cited

U.S. PATENT DOCUMENTS

| | | |
|---|---|---|
| 2016/0283920 A1 | 9/2016 | Fisher et al. |
| 2016/0292672 A1 | 10/2016 | Fay et al. |
| 2017/0140408 A1 | 5/2017 | Wuehler |
| 2018/0211340 A1* | 7/2018 | Cook ................... G06Q 20/042 |
| 2019/0208418 A1 | 7/2019 | Breu |
| 2019/0236559 A1 | 8/2019 | Padmanabhan |
| 2019/0340946 A1* | 11/2019 | Elmessiry .......... G06Q 20/3678 |
| 2020/0193516 A9 | 6/2020 | De Jong et al. |
| 2020/0328890 A1 | 10/2020 | Connor |
| 2021/0097508 A1 | 4/2021 | Papanikolas |
| 2021/0133700 A1 | 5/2021 | Williams et al. |
| 2021/0150626 A1 | 5/2021 | Robotham |
| 2021/0226777 A1* | 7/2021 | Wilson .................. H04L 9/0861 |
| 2021/0256070 A1 | 8/2021 | Tran et al. |
| 2022/0006651 A1* | 1/2022 | Soundararajan .... H04W 12/069 |
| 2023/0026561 A1* | 1/2023 | Valle .................. G06Q 30/0601 |

* cited by examiner

ELECTRONIC SYSTEM FOR AUTOMATIC PROVISIONING OF LIMITED-TRANSFERABILITY ELECTRONIC DIGITAL CERTIFICATES ASSOCIATED WITH EVENTS

FIELD OF THE INVENTION

The present invention embraces an electronic system for automatic provisioning of limited-transferability electronic certificates associated with events.

BACKGROUND

An entity may provide a user with an item for attending an event, in recognition of an achievement, to endorse the user, and/or the like. For example, the item may provide evidence that the user attended the event, attained the achievement, and/or received the endorsement. Additionally, the item may serve as a collector item and/or a memento for the event, achievement, or endorsement.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. This summary presents some concepts of one or more embodiments of the present invention in a simplified form as a prelude to the more detailed description that is presented later.

In one aspect, a system for automatic provisioning of limited-transferability electronic certificates associated with events is presented. The system may include at least one non-transitory storage device and at least one processing device coupled to the at least one non-transitory storage device, where the at least one processing device may be configured to receive event data including event information associated with an event, receive user data including user information associated with a user, where the user is associated with the event, and generate, based on the event data and the user data, an electronic digital certificate. The at least one processing device may be configured to store the electronic digital certificate on a distributed ledger and generate, on the distributed ledger, a smart contract associated with the electronic digital certificate, where the smart contract prevents transfer of the electronic digital certificate to other users. The at least one processing device may be configured to record, on the distributed ledger, that the user owns the electronic digital certificate and provide, to a user device associated with the user, a notification that the user owns the electronic digital certificate.

In some embodiments, the at least one processing device may be configured to, when generating the electronic digital certificate, provide metadata in the electronic digital certificate, where the metadata is based on the event data and the user data. Additionally, or alternatively, the metadata may include information associated with attendance of the user at the event. In some embodiments, the metadata may include information associated with performance of the user at the event. Additionally, or alternatively, the metadata may include an image associated with the event, information identifying users associated with the event, information identifying entities associated with the event, information identifying a location of the event, and/or the like. In some embodiments, the metadata may include first information associated with a recognition of the user and second information associated with another user providing the recognition.

In some embodiments, the at least one processing device may be configured to provide a digital platform for users to share information associated with electronic digital certificates, receive, from the user device, permission to share the electronic digital certificate, and provide, via the digital platform, a display including at least a portion of the event information and at least a portion of the user information. Additionally, or alternatively, the at least one processing device may be configured to provide, via the digital platform, another display including information associated with a plurality of electronic digital certificates owned by the user.

In some embodiments, the event may be associated with an entity, and the smart contract may permit transfer of the electronic digital certificate to the entity. Additionally, or alternatively, the at least one processing device may be configured to receive, from the user device, an instruction to transfer the electronic digital certificate to the entity and record, on the distributed ledger and based on receiving the instruction, that the entity owns the electronic digital certificate.

In some embodiments, the smart contract may permit transfer of the electronic digital certificate to authorized users. Additionally, or alternatively, the at least one processing device may be configured to receive, from the user device, an instruction to transfer the electronic digital certificate to an authorized user of the authorized users, record, on the distributed ledger and based on receiving the instruction, that the authorized user owns the electronic digital certificate, and provide, to another user device associated with the authorized user, another notification that the authorized user owns the electronic digital certificate.

In some embodiments, the event may be associated with an entity, and the smart contract may only permit transfer of the electronic digital certificate from the entity.

In some embodiments, the smart contract may prevent all transfers of the electronic digital certificate.

In another aspect, a computer program product for automatic provisioning of limited-transferability electronic certificates associated with events is presented. The computer program product may include a non-transitory computer-readable medium including code causing a first apparatus to receive event data including event information associated with an event, receive user data including user information associated with a user, where the user is associated with the event, and generate, based on the event data and the user data, an electronic digital certificate. The computer program product may include a non-transitory computer-readable medium including code causing the first apparatus to store the electronic digital certificate on a distributed ledger and generate, on the distributed ledger, a smart contract associated with the electronic digital certificate, where the smart contract prevents transfer of the electronic digital certificate to other users. The computer program product may include a non-transitory computer-readable medium including code causing the first apparatus to record, on the distributed ledger, that the user owns the electronic digital certificate and provide, to a user device associated with the user, a notification that the user owns the electronic digital certificate.

In some embodiments, the non-transitory computer-readable medium may include code causing the first apparatus to, when generating the electronic digital certificate, provide metadata in the electronic digital certificate, where the metadata is based on the event data and the user data. Additionally, or alternatively, the metadata may include information associated with attendance of the user at the event. In some embodiments, the metadata may include information associated with performance of the user at the event. Additionally, or alternatively, the metadata may include an image associated with the event, information identifying users associated with the event, information identifying entities associated with the event, information identifying a location of the event, and/or the like.

In yet another aspect, a method for automatic provisioning of limited-transferability electronic certificates associated with events is presented. The method may include receiving event data including event information associated with an event, receiving user data including user information associated with a user, where the user is associated with the event, and generating, based on the event data and the user data, an electronic digital certificate. The method may include storing the electronic digital certificate on a distributed ledger and generating, on the distributed ledger, a smart contract associated with the electronic digital certificate, where the smart contract prevents transfer of the electronic digital certificate to other users. The method may include recording, on the distributed ledger, that the user owns the electronic digital certificate and providing, to a user device associated with the user, a notification that the user owns the electronic digital certificate.

The features, functions, and advantages that have been discussed may be achieved independently in various embodiments of the present invention or may be combined with yet other embodiments, further details of which may be seen with reference to the following description and drawings.

BRIEF DESCRIPTION OF THE DRAWINGS

Figure 1:
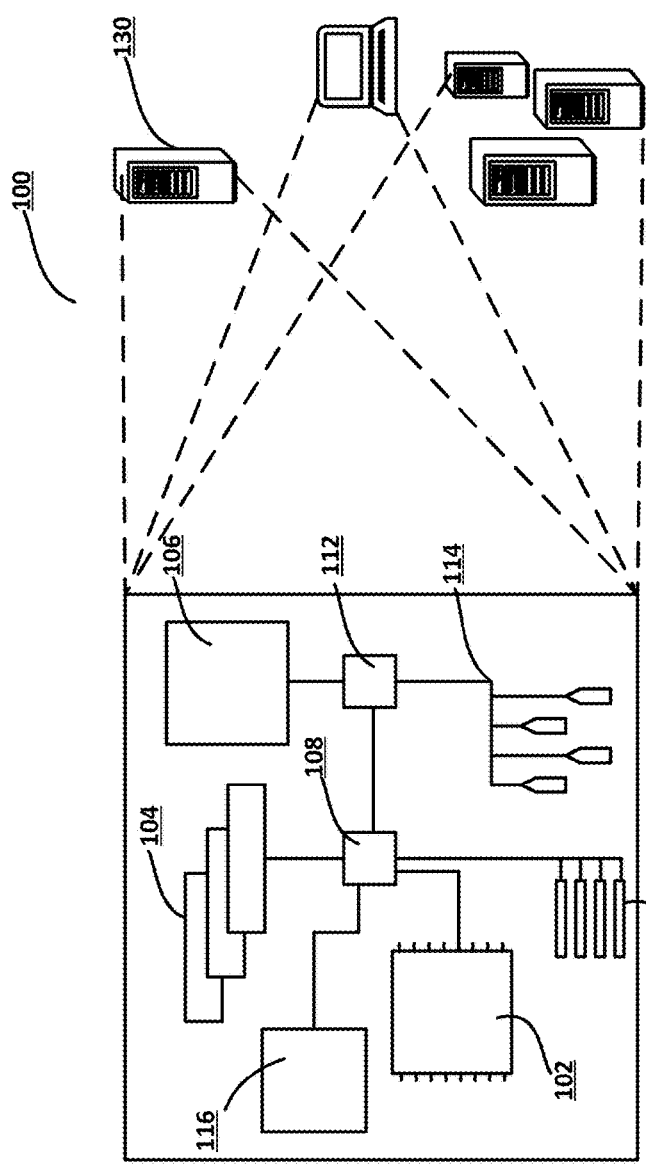
Figure 1:
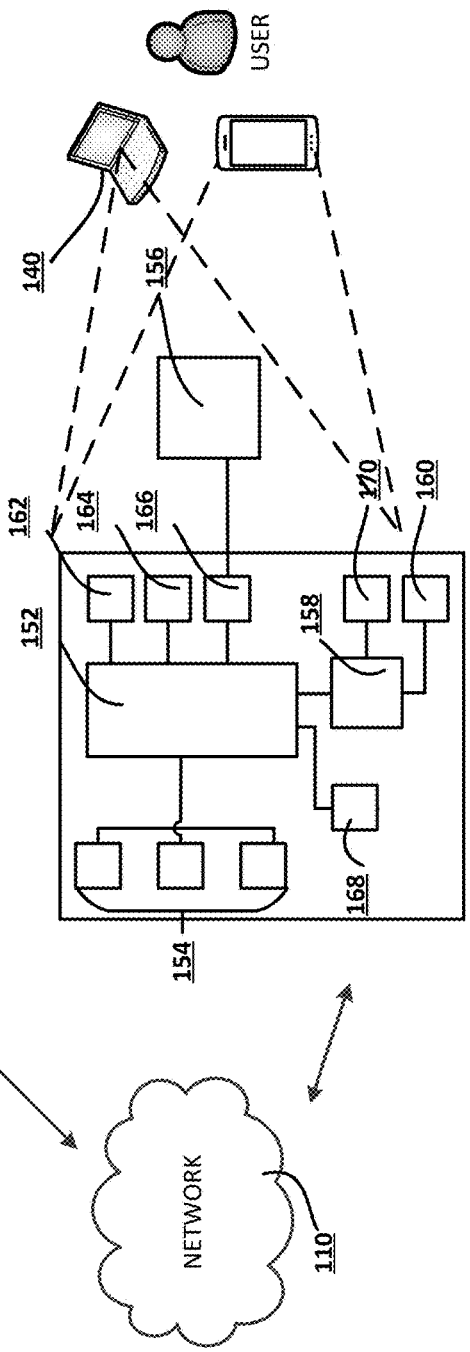
Figure 2:
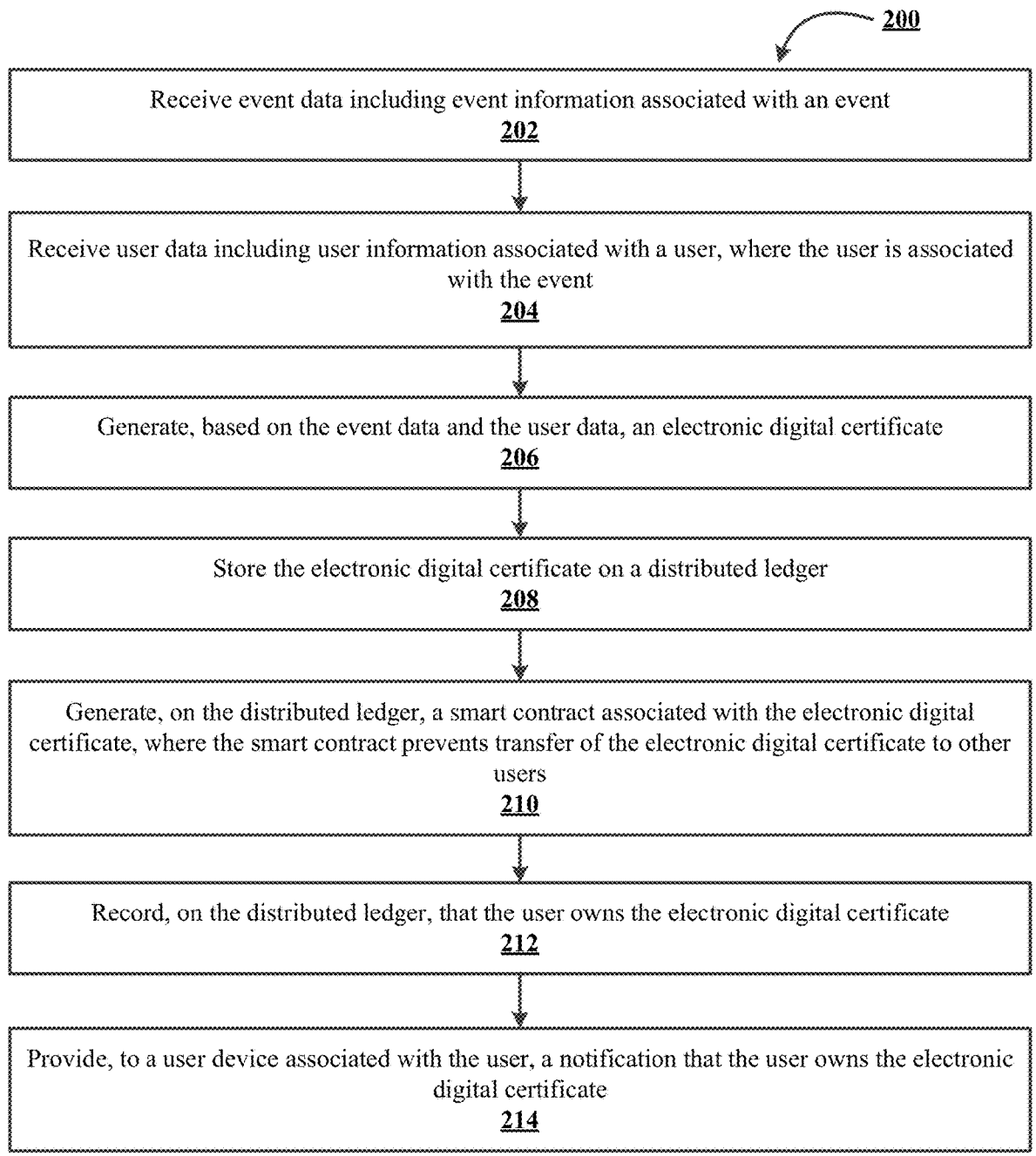
Figure 3:
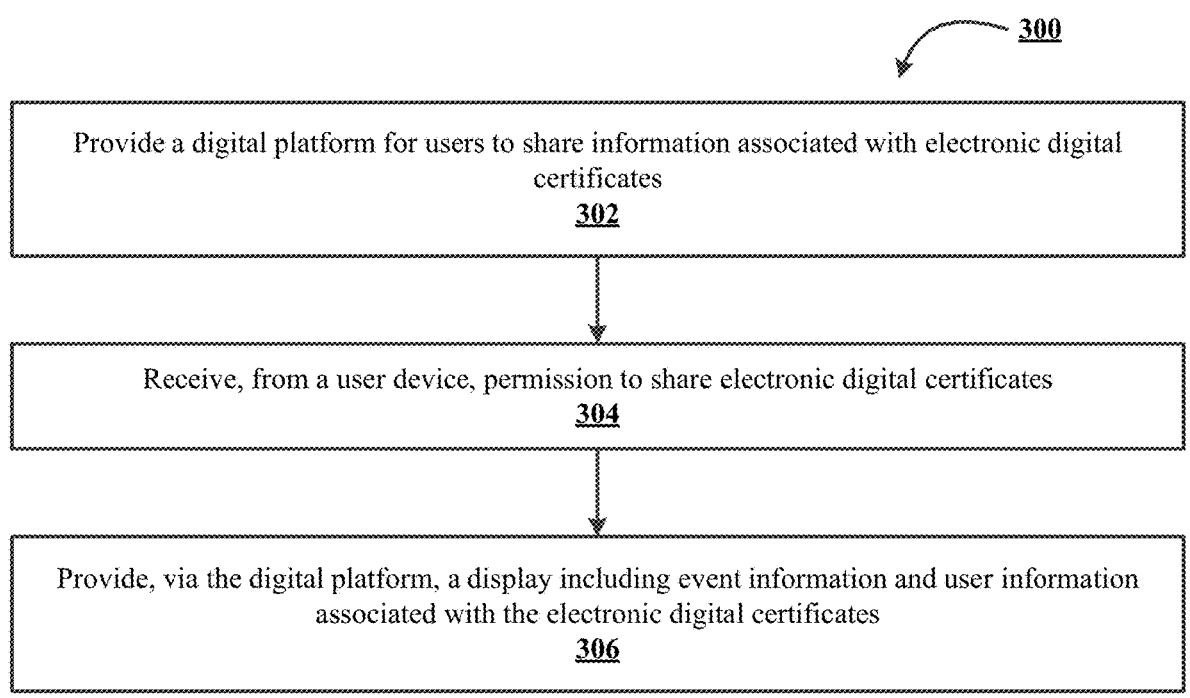

Having thus described embodiments of the invention in general terms, reference will now be made the accompanying drawings, wherein:

FIG. 1 illustrates technical components of a system generating limited-transferability electronic digital certificates associated with events, in accordance with an embodiment of the invention;

FIG. 2 illustrates a process flow for automatic provisioning of limited-transferability electronic certificates associated with events, in accordance with an embodiment of the invention; and FIG. 3 illustrates a process flow for providing a digital platform for users to share information associated with limited-transferability electronic digital certificates associated with events, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As noted, an entity may provide a user with an item (e.g., a physical item, a digital item, and/or the like) for attending an event, in recognition of an achievement, to endorse the user, and/or the like. For example, the item may provide evidence that the user attended the event, attained the achievement, and/or received the endorsement. Additionally, the item may serve as a collector item and/or a memento for the event, achievement, or endorsement. However, the user may transfer the item to another user, thereby allowing the other user to falsely assert having attended the event, attained the achievement, and/or received the endorsement. Such false assertions may permit the other user to access and/or consume resources (e.g., financial resources, computing resources, network resources, and/or the like). Furthermore, preventing, detecting, mitigating, correcting, and/or the like such access and/or consumption based on false assertions further consumes resources (e.g., financial resources, computing resources, network resources, and/or the like).

Some embodiments described herein provide a system, a computer program product, and/or a method for automatic provisioning of limited-transferability electronic certificates associated with events. For example, a system (e.g., an electronic system for automatic provisioning of limited-transferability electronic certificates associated with events and/or the like) may be configured to receive event data including event information associated with an event, receive user data including user information associated with a user, where the user is associated with the event, and generate, based on the event data and the user data, an electronic digital certificate (e.g., a non-fungible token and/or the like). In some embodiments, the system may be configured to store the electronic digital certificate on a distributed ledger and generate, on the distributed ledger, a smart contract associated with the electronic digital certificate, where the smart contract prevents transfer of the electronic digital certificate to other users.

For example, the system may generate an electronic digital certificate to commemorate a user attending an event and/or as recognition of an achievement (e.g., as a collector item, a memento, and/or the like). The metadata of the electronic digital certificate may include an image associated with the event, information about the event and/or the achievement, people and/or entities associated with the event and/or achievement, point and/or time specific data, and/or the like. In some embodiments, the electronic digital certificate may be customized to the user attending the event and/or reaching the achievement. Additionally, or alternatively, the user may be able to share (e.g., via a digital platform and/or the like) a wallet to publicly and/or privately show other users the electronic digital certificates that they have accumulated.

In some embodiments, the system may be configured to generate and/or deploy protections to manage the lifecycle and/or transferability of electronic digital certificates. In this way, a user may not be able to transfer the event attendance and/or the achievement unless authorized to do so. As such, the system manages the distribution of electronic digital certificates via one or more smart contracts associated with the electronic digital certificates to permit the "to" and the "from" fields of the smart contracts to be limited, such that users cannot transfer the electronic digital certificates unless the transfer is to an authorized receiver. Additionally, or alternatively, the system may be configured to generate different types of electronic digital certificates based on the event and/or achievement.

By managing transfer of electronic digital certificates in this way, the system may conserve resources (e.g., financial resources, computing resources, network resources, and/or the like) that would otherwise be consumed by allowing transfers of electronic digital certificates permitting other users to falsely assert attendance, achievement, and/or endorsement and access to and/or consumption of resources. Furthermore, the system may conserve resources (e.g., financial resources, computing resources, network resources, and/or the like) that would otherwise be consumed by preventing, detecting, mitigating, correcting, and/or the like such access and/or consumption based on false assertions.

As used herein, an "entity" may be any institution employing information technology resources and particularly technology infrastructure configured for processing large amounts of data. Typically, the data may be related to products, services, and/or the like offered and/or provided by the entity, customers of the entity, other aspect of the operations of the entity, people who work for the entity, and/or the like. As such, the entity may be an institution, group, association, financial institution, establishment, company, union, authority, merchant, service provider, and/or or the like employing information technology resources for processing large amounts of data. In some embodiments, the entity may be an institution, group, association, financial institution, establishment, company, union, authority, merchant, service provider, and/or or the like hosting, sponsoring, coordinating, creating, and/or the like events, recognitions, achievements, and/or the like.

As used herein, a "user" may be an individual associated with an entity. As such, in some embodiments, the user may be an individual having past relationships, current relationships or potential future relationships with an entity. In some embodiments, a "user" may be an employee (e.g., an associate, a project manager, a manager, an administrator, an internal operations analyst, and/or the like) of the entity and/or enterprises affiliated with the entity, capable of operating systems described herein. In some embodiments, a "user" may be any individual, another entity, and/or a system who has a relationship with the entity, such as a customer, a prospective customer, and/or the like. In some embodiments, a user may be a system performing one or more tasks described herein.

As used herein, a "user interface" may be any device or software that allows a user to input information, such as commands and/or data, into a device, and/or that allows the device to output information to the user. For example, a user interface may include an application programmer interface (API), a graphical user interface (GUI), and/or an interface to input computer-executable instructions that direct a processing device to carry out functions. The user interface may employ input and/or output devices to input data received from a user and/or output data to a user. Input devices and/or output devices may include a display, API, mouse, keyboard, button, touchpad, touch screen, microphone, speaker, LED, light, joystick, switch, buzzer, bell, and/or other devices for communicating with one or more users.

As used herein, a "resource" may generally refer to objects, products, devices, goods, commodities, services, offers, discounts, currency, cash, cash equivalents, rewards, reward points, benefit rewards, bonus miles, cash back, credits, and/or the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, and/or the like.

As used herein, a "source retainer" may generally refer to an account, a system, and/or the like associated with a user and/or a type of resources, such as software, a checking account, a deposit account, a savings account, a credit account, a rewards account, a rewards points account, a benefit rewards account, a bonus miles account, a cash back account, and/or the like, which may be managed and/or maintained by an entity, such as a financial institution, an electronic resource transfer institution (e.g., a credit card company, a debit card company, a prepaid card company, and/or the like), a credit union, and/or the like.

As used herein, a "distribution" and/or an "allocation" may refer to any transaction, activities, and/or communication between one or more entities, between a user and one or more entities, and/or the like. A resource distribution and/or an allocation of resources may refer to any distribution of resources such as, but not limited to, a payment, processing of funds, purchase of goods or services, a return of goods or services, a payment transaction, a credit transaction, other interactions involving a user's resource or account, and/or the like. In the context of an entity such as a financial institution, a resource distribution and/or an allocation of resources may refer to one or more of a sale of goods and/or services, initiating an automated teller machine (ATM) or online financial session, an account balance inquiry, a rewards transfer, an account money transfer or withdrawal, opening a financial application on a user's computer or mobile device, a user accessing their e-wallet, any other interaction involving the user and/or the user's device that invokes and/or is detectable by the financial institution, and/or the like. In some embodiments, the user may authorize a resource distribution and/or an allocation of resources using a resource distribution instrument (e.g., credit cards, debit cards, checks, digital wallets, currency, loyalty points, and/or the like) and/or resource distribution credentials (e.g., account numbers, resource distribution instrument identifiers, and/or the like). A resource distribution and/or an allocation of resources may include one or more of the following: renting, selling, and/or leasing goods and/or services (e.g., groceries, stamps, tickets, DVDs, vending machine items, and/or the like); making payments to creditors (e.g., paying monthly bills; paying federal, state, and/or local taxes, and/or the like); sending remittances; loading money onto stored value cards (SVCs) and/or prepaid cards; donating to charities; and/or the like. Unless specifically limited by the context, a "resource distribution," an "allocation of resources," a "resource transfer," a "transaction," a "transaction event," and/or a "point of transaction event" may refer to any activity between a user, a merchant, an entity, and/or the like. In some embodiments, a resource distribution and/or an allocation of resources may refer to financial transactions involving direct or indirect movement of funds through traditional paper transaction processing systems (e.g., paper check processing) or through electronic transaction processing systems. In this regard, resource distributions and/or allocations of resources may refer to the user initiating a purchase for a product, service, or the like from a merchant. Typical financial resource distribution and/or financial allocations of resources include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points, and/or the like. When describing that resource transfers or transactions are evaluated, such descriptions may mean that the transaction has already occurred, is in the process of occurring or being processed, or has yet to be processed/posted by one or more financial institutions.

As used herein, "resource distribution instrument" may refer to an electronic payment vehicle, such as an electronic credit, debit card, and/or the like, associated with a source retainer (e.g., a checking account, a deposit account, a savings account, a credit account, and/or the like). In some embodiments, the resource distribution instrument may not be a "card" and may instead be account identifying information stored electronically in a user device, such as payment credentials and/or tokens and/or aliases associated with a digital wallet, account identifiers stored by a mobile application, and/or the like.

In some embodiments, the term "module" with respect to an apparatus may refer to a hardware component of the apparatus, a software component of the apparatus, and/or a component of the apparatus that includes both hardware and software. In some embodiments, the term "chip" may refer to an integrated circuit, a microprocessor, a system-on-a-chip, a microcontroller, and/or the like that may either be integrated into the external apparatus, may be inserted and/or removed from the external apparatus by a user, and/or the like.

As used herein, an "engine" may refer to core elements of a computer program, part of a computer program that serves as a foundation for a larger piece of software and drives the functionality of the software, and/or the like. An engine may be self-contained but may include externally controllable code that encapsulates powerful logic designed to perform or execute a specific type of function. In one aspect, an engine may be underlying source code that establishes file hierarchy, input and/or output methods, how a part of a computer program interacts and/or communicates with other software and/or hardware, and/or the like. The components of an engine may vary based on the needs of the computer program as part of the larger piece of software. In some embodiments, an engine may be configured to retrieve resources created in other computer programs, which may then be ported into the engine for use during specific operational aspects of the engine. An engine may be configurable to be implemented within any general-purpose computing system. In doing so, the engine may be configured to execute source code embedded therein to control specific features of the general-purpose computing system to execute specific computing operations, thereby transforming the general-purpose system into a specific purpose computing system.

As used herein, a "component" of an application may include a software package, a service, a resource, a module, and/or the like that includes a set of related functions and/or data. In some embodiments, a component may provide a source capability (e.g., a function, a business function, and/or the like) to an application including the component. In some embodiments, components of an application may communicate with each other via interfaces and may provide information to each other indicative of the services and/or functions that other components may utilize and/or how other components may utilize the services and/or functions. Additionally, or alternatively, components of an application may be substitutable such that a component may replace another component. In some embodiments, components may include objects, collections of objects, and/or the like.

As used herein, "authentication credentials" may be any information that may be used to identify a user. For example, a system may prompt a user to enter authentication information such as a username, a password, a token, a personal identification number (PIN), a passcode, biometric information (e.g., voice authentication, a fingerprint, and/or a retina scan), an answer to a security question, a unique intrinsic user activity, such as making a predefined motion with a user device, and/or the like. The authentication information may be used to authenticate the identity of the user (e.g., determine that the authentication information is associated with an account) and/or determine that the user has authority to access an account or system. In some embodiments, the system may be owned and/or operated by an entity. In such embodiments, the entity may employ additional computer systems, such as authentication servers, to validate and certify resources inputted by a plurality of users within the system. The system may further use authentication servers to certify the identity of users of the system, such that other users may verify the identity of the certified users. In some embodiments, the entity may certify the identity of the users. Furthermore, authentication information and/or permission may be assigned to and/or required from a user, application, computing node, computing cluster, and/or the like to access stored data within at least a portion of the system.

As used herein, an "interaction" may refer to any communication between one or more users, one or more entities or institutions, and/or one or more devices, nodes, clusters, and/or systems within the system environment described herein. For example, an interaction may refer to a transfer of data between devices, an accessing of stored data by one or more nodes of a computing cluster, a transmission of a requested task, and/or the like. In some embodiments, an interaction may refer to an entity, a user, a system, and/or a device providing an advertisement, information, data, a user interface, and/or the like to another entity, another user, another system, and/or another device.

As used herein, an "electronic digital certificate" may refer to any electronic and/or digital documentation of ownership, which may include, but is not limited to, non-fungible tokens (NFTs). NFTs may be blockchain supported units of data containing information related to ownership.

As used herein, a "digital platform" may refer to any digital ledger technology, which may include, but is not limited to, blockchain-based digital rights management platforms. A digital platform may refer to any website, application, network, or any other electronic form of storing and/or processing digital rights, such as NFTs. In some embodiments, the digital platform may be any platform that stores and manages the rights to NFTs. Additionally, or alternatively, the digital platform may be a blockchain-based digital rights management platform owned, operated, maintained, and/or the like by an entity, such as a financial institution, for permitting users to receive, manage, display, and/or the like NFTs or electronic digital certificates, offer the NFTs or electronic digital certificates to other users, use the NFTs, and/or the like.

As used herein, an "event" may refer to a gathering of people (e.g., a conference, a party, an exposition, a competition, and/or the like), an achievement (e.g., participation in and/or result of a competition, recognition and/or endorsement in a job, and/or the like), a go-to-market event, a product launch, a product release, an activity, an occasion, a contest, an outcome, and/or the like.

FIG. 1 presents an exemplary block diagram of a system environment 100 for automatic provisioning of limited-transferability electronic certificates associated with events within a technical environment, in accordance with an embodiment of the invention. FIG. 1 provides a system environment 100 that includes specialized servers and a system communicably linked across a distributive network of nodes required to perform functions of process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device, a non-mobile computing device, and/or the like. The user may be a person who uses the user input system 140 to access, view modify, interact with, and/or the like information, data, images, video, and/or the like. The user may be a person who uses the user input system 140 to initiate, perform, monitor, and/or the like changes and/or modifications to one or more systems, applications, services, and/or the like. The one or more systems, applications, services, and/or the like may be configured to communicate with the system 130, input information onto a user interface presented on the user input system 140, and/or the like. The applications stored on the user input system 140 and the system 130 may incorporate one or more parts of any process flow described herein.

As shown in FIG. 1, the system 130 and the user input system 140 are each operatively and selectively connected to the network 110, which may include one or more separate networks. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology.

In some embodiments, the system 130 and the user input system 140 may be used to implement processes described herein, including user-side and server-side processes generating limited-transferability electronic digital certificates associated with events, in accordance with an embodiment of the present invention. The system 130 may represent various forms of digital computers, such as laptops, desktops, workstations, personal digital assistants, servers, blade servers, mainframes, and/or the like. The user input system 140 may represent various forms of mobile devices, such as personal digital assistants, cellular telephones, smartphones, smart glasses, and/or the like. The components shown here, their connections, their relationships, and/or their functions, are meant to be exemplary only, and are not meant to limit implementations of the inventions described and/or claimed in this document.

In some embodiments, the system 130 may include a processor 102, memory 104, a storage device 106, a high-speed interface 108 connecting to memory 104, high-speed expansion ports 111, and a low-speed interface 112 connecting to low-speed bus 114 and storage device 106. Each of the components 102, 104, 106, 108, 111, and 112 may be interconnected using various buses, and may be mounted on a common motherboard or in other manners as appropriate. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130 may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, a software and/or hardware development company, a software and/or hardware testing company, and/or the like. The system 130 may be located at a facility associated with the entity and/or remotely from the facility associated with the entity.

The memory 104 may store information within the system 130. In one implementation, the memory 104 may be a volatile memory unit or units, such as volatile random-access memory (RAM) having a cache area for the temporary storage of information. In another implementation, the memory 104 may be a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 may be capable of providing mass storage for the system 130. In one aspect, the storage device 106 may be or contain a computer-readable medium, such as a floppy disk device, a hard disk device, an optical disk device, a tape device, a flash memory and/or other similar solid state memory device, and/or an array of devices, including devices in a storage area network or other configurations. A computer program product may be tangibly embodied in an information carrier. The computer program product may also contain instructions that, when executed, perform one or more methods, such as those described herein. The information carrier may be a non-transitory computer-readable or machine-readable storage medium, such as the memory 104, the storage device 106, and/or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 may manage bandwidth-intensive operations for the system 130, while the low-speed interface 112 and/or controller manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In some embodiments, low-speed interface 112 and/or controller is coupled to storage device 106 and low-speed bus 114 (e.g., expansion port). The low-speed bus 114, which may include various communication ports (e.g., USB, Bluetooth, Ethernet, wireless Ethernet), may be coupled to one or more input/output devices, such as a keyboard, a pointing device, a scanner, and/or a networking device such as a switch or router (e.g., through a network adapter).

The system 130 may be implemented in a number of different forms, as shown in FIG. 1. For example, it may be implemented as a standard server or multiple times in a group of such servers. Additionally, or alternatively, the system 130 may be implemented as part of a rack server system, a personal computer, such as a laptop computer, and/or the like. Alternatively, components from system 130 may be combined with one or more other same or similar systems and the user input system 140 may be made up of multiple computing devices communicating with each other.

FIG. 1 also illustrates a user input system 140, in accordance with an embodiment of the invention. The user input system 140 may include a processor 152, memory 154, an input/output device such as a display 156, a communication interface 158, and a transceiver 160, among other components, such as one or more image sensors. The user input system 140 may also be provided with a storage device, such as a microdrive and/or the like, to provide additional storage. Each of the components 152, 154, 158, and 160, may be interconnected using various buses, and several of the components may be mounted on a common motherboard or in other manners as appropriate.

The processor 152 may be configured to execute instructions within the user input system 140, including instructions stored in the memory 154. The processor 152 may be implemented as a chipset of chips that include separate and multiple analog and/or digital processors. The processor 152 may be configured to provide, for example, for coordination of the other components of the user input system 140, such as control of user interfaces, applications run by user input system 140, and/or wireless communication by user input system 140.

The processor 152 may be configured to communicate with the user through control interface 164 and display interface 166 coupled to a display 156. The display 156 may be, for example, a Thin-Film-Transistor Liquid Crystal Display (TFT LCD) or an Organic Light Emitting Diode (OLED) display, and/or other appropriate display technology. An interface of the display 156 may include appropriate circuitry and may be configured for driving the display 156 to present graphical and other information to a user. The control interface 164 may receive commands from a user and convert them for submission to the processor 152. In addition, an external interface 168 may be provided in communication with processor 152 to enable near area communication of user input system 140 with other devices. External interface 168 may provide, for example, for wired communication in some implementations, or for wireless communication in other implementations, and multiple interfaces may also be used.

The memory 154 may store information within the user input system 140. The memory 154 may be implemented as one or more of a computer-readable medium or media, a volatile memory unit or units, or a non-volatile memory unit or units. Expansion memory may also be provided and connected to user input system 140 through an expansion interface (not shown), which may include, for example, a Single In Line Memory Module (SIMM) card interface. Such expansion memory may provide extra storage space for user input system 140 and/or may store applications and/or other information therein. In some embodiments, expansion memory may include instructions to carry out or supplement the processes described above and/or may include secure information. For example, expansion memory may be provided as a security module for user input system 140 and may be programmed with instructions that permit secure use of user input system 140. Additionally, or alternatively, secure applications may be provided via the SIMM cards, along with additional information, such as placing identifying information on the SIMM card in a secure manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In some embodiments, a computer program product may be tangibly embodied in an information carrier. The computer program product may contain instructions that, when executed, perform one or more methods, such as those described herein. The information carrier may be a computer-readable or machine-readable medium, such as the memory 154, expansion memory, memory on processor 152, and/or a propagated signal that may be received, for example, over transceiver 160 and/or external interface 168.

In some embodiments, the user may use the user input system 140 to transmit and/or receive information and/or commands to and/or from the system 130. In this regard, the system 130 may be configured to establish a communication link with the user input system 140, whereby the communication link establishes a data channel (wired and/or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, and/or the like.

The user input system 140 may communicate with the system 130 (and one or more other devices) wirelessly through communication interface 158, which may include digital signal processing circuitry. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker (e.g., in a handset) of user input system 140. Such sound may include sound from voice telephone calls, may include recorded sound (e.g., voice messages, music files, and/or the like) and may also include sound generated by one or more applications operating on the user input system 140, and in some embodiments, one or more applications operating on the system 130.

Various implementations of the systems and techniques described here may be realized in digital electronic circuitry, integrated circuitry, specially designed ASICs (application specific integrated circuits), computer hardware, firmware, software, and/or combinations thereof. Such various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and/or at least one output device.

Computer programs (e.g., also referred to as programs, software, applications, code, and/or the like) may include machine instructions for a programmable processor, and may be implemented in a high-level procedural and/or object-oriented programming language, and/or in assembly/machine language. As used herein, the terms "machine-readable medium" and/or "computer-readable medium" may refer to any computer program product, apparatus and/or device (e.g., magnetic discs, optical disks, memory, Programmable Logic Devices (PLDs), and/or the like) used to provide machine instructions and/or data to a programmable processor, including a machine-readable medium that receives machine instructions as a machine-readable signal. The term "machine-readable signal" may refer to any signal used to provide machine instructions and/or data to a programmable processor.

To provide for interaction with a user, the systems and/or techniques described herein may be implemented on a computer having a display device (e.g., a CRT (cathode ray tube), an LCD (liquid crystal display) monitor, and/or the like) for displaying information to the user, a keyboard by which the user may provide input to the computer, and/or a pointing device (e.g., a mouse or a trackball) by which the user may provide input to the computer. Other kinds of devices may be used to provide for interaction with a user as well. For example, feedback provided to the user may be any form of sensory feedback (e.g., visual feedback, auditory feedback, and/or tactile feedback). Additionally, or alternatively, input from the user may be received in any form, including acoustic, speech, and/or tactile input.

The systems and techniques described herein may be implemented in a computing system that includes a back end component (e.g., as a data server), that includes a middleware component (e.g., an application server), that includes a front end component (e.g., a client computer having a graphical user interface or a Web browser through which a user may interact with an implementation of the systems and techniques described here), and/or any combination of such back end, middleware, and/or front end components. Components of the system may be interconnected by any form or medium of digital data communication (e.g., a communication network). Examples of communication networks include a local area network ("LAN"), a wide area network ("WAN"), and/or the Internet.

In some embodiments, computing systems may include clients and servers. A client and server may generally be remote from each other and typically interact through a communication network. The relationship of client and server may arise by virtue of computer programs running on the respective computers and having a client-server relationship to each other.

The embodiment of the system environment 100 illustrated in FIG. 1 is exemplary and other embodiments may vary. As another example, in some embodiments, the system 130 includes more, less, or different components. As another example, in some embodiments, some or all of the portions of the system environment 100, the system 130, and/or the user input system 140 may be combined into a single portion. Likewise, in some embodiments, some or all of the portions of the system environment 100, the system 130, and/or the user input system 140 may be separated into two or more distinct portions.

In some embodiments, the system environment may 100 include one or more user input systems and/or one or more electronic digital certificate generating systems (e.g., similar to the system 130 and/or the user input system 140) associated with an entity (e.g., a business, a merchant, a financial institution, a card management institution, an software and/or hardware development company, a software and/or hardware testing company, and/or the like). For example, a user (e.g., an employee, a customer, and/or the like) may use a user input system (e.g., similar to the user input system 140) to initiate generation of one or more electronic digital certificates associated with one or more events using one or more systems, applications, services, and/or the like (e.g., similar to the system 130, running a system similar to the system 130, and/or the like) and the user input system may provide information (e.g., event information, user information, and/or the like) to an electronic digital certificate generating system (e.g., similar to the system 130, running a system similar to the system 130, and/or the like). In some embodiments, the user input system and/or the electronic digital certificate generating system associated with the entity may perform one or more of the steps described herein with respect to the process flow described herein with respect to FIGS. 2 and/or 3.

FIG. 2 illustrates a process flow 200 for automatic provisioning of limited-transferability electronic certificates associated with events within a technical environment, in accordance with an embodiment of the invention. In some embodiments, an electronic digital certificate generating system and/or the like (e.g., similar to one or more of the systems described herein with respect to FIG. 1) may perform one or more of the steps of process flow 200.

As shown in block 202, the process flow 200 may include receiving event data including event information associated with an event. For example, an electronic digital certificate generating system may receive event data including event information associated with an event. In some embodiments, the event may be a gathering of people (e.g., a conference, a party, an exposition, a competition, and/or the like), an activity, an occasion, a contest, and/or the like, and the event information may include information regarding the event, such as an image associated with the event (e.g., a logo, a photograph associated with the event, a photograph captured during the event, an image of the event venue, and/or the like), a time and/or date of the event, a location of the event, a name of the event, a slogan of the event, an entity hosting the event, an entity sponsoring the event, an entity coordinating the event, and/or the like. For example, the event may be a conference, and the event information may include a name of the conference, an image of the logo of the conference, a time and date of the conference, the location of the conference, one or more sponsors of the conference, a host of the conference, and/or the like.

Additionally, or alternatively, the event may be an achievement (e.g., participation in and/or result of a competition, recognition and/or endorsement in a job, and/or the like), and the event information may include information regarding the achievement, such as an image associated with the achievement (e.g., a logo, a photograph associated with the achievement, a photograph captured during the achievement, an image of a venue associated with the achievement, and/or the like), a time and/or date of the achievement, a type of the achievement, a name of the achievement, a slogan of the achievement, a person and/or entity associated with and/or providing the achievement, and/or the like. For example, the event may be a recognition and/or award from an employer, and the event information may include the name of the recognition and/or award, the name of the recipient, the name of the employer, the type of recognition and/or award, the date the recognition and/or award was presented, a description of the recognition and/or award, an image associated with the recognition and/or award, and/or the like.

As shown in block 204, the process flow 200 may include receiving user data including user information, where the user is associated with the event. For example, an electronic digital certificate generating system may receive user data including user information, where the user is associated with the event. In some embodiments, the user may be associated with the event by being an individual that attended the event, an individual that is associated with an entity that is associated with the event (e.g., a host, a sponsor, and/or the like), an individual that accomplished an achievement, an individual that performed in a competition, and/or the like. Additionally, or alternatively, the user information may include information identifying a user that attended an event, information identifying a user that accomplished an achievement, information identifying a user that performed in a competition, information identifying a user device associated with a user, information identifying one or more resources associated with a user, information identifying one or more source retainers associated with a user, information identifying a digital wallet (e.g., for storing electronic digital certificates and/or the like) associated with a user, and/or the like.

As shown in block 206, the process flow 200 may include generating, based on the event data and the user data, an electronic digital certificate. For example, an electronic digital certificate generating system may generate, based on the event data and the user data, an electronic digital certificate. In some embodiments, the electronic digital certificate may include and/or be an NFT including metadata based on the event data and the user data.

As shown in block 208, the process flow 200 may include storing the electronic digital certificate on a distributed ledger. For example, an electronic digital certificate generating system may store the electronic digital certificate on a distributed ledger. In some embodiments, the distributed ledger may include a blockchain distributed ledger and/or the like. In some embodiments, the process flow 200 may include generating the electronic digital certificate on the distributed ledger.

As shown in block 210, the process flow 200 may include generating, on the distributed ledger, a smart contract associated with the electronic digital certificate, where the smart contract prevents transfer of the electronic digital certificate to other users. For example, an electronic digital certificate generating system may generate, on the distributed ledger, a smart contract associated with the electronic digital certificate, where the smart contract prevents transfer of the electronic digital certificate to other users. In some embodiments, the smart contract may include terms identifying permissible transferors (e.g., users and/or user devices from whom the electronic digital certificate may be transferred), terms identifying permissible transferees (e.g., users and/or user devices to whom the electronic digital certificate may be transferred), and the terms of the smart contract may be adjusted to prevent transfer of the electronic digital certificate. For example, the smart contract may only permit the electronic digital certificate to be transferred from a particular entity, a particular group of entities, a particular user, a particular group of users, and/or the like. As another example, the smart contract may only permit the electronic digital certificate to be transferred to a particular entity, a particular group of entities, a particular user, a particular group of users, and/or the like.

As shown in block 212, the process flow 200 may include recording, on the distributed ledger, that the user owns the electronic digital certificate. For example, an electronic digital certificate generating system may record, on the distributed ledger, that the user owns the electronic digital certificate.

As shown in block 214, the process flow 200 may include providing, to a user device associated with the user, a notification that the user owns the electronic digital certificate. For example, an electronic digital certificate generating system may provide, to a user device associated with the user, a notification that the user owns the electronic digital certificate.

Process flow 200 may include additional embodiments, such as any single embodiment or any combination of embodiments described below and/or in connection with one or more other processes described elsewhere herein.

In a first embodiment, the process flow 200 may include, when generating the electronic digital certificate, providing metadata in the electronic digital certificate, where the metadata is based on the event data and the user data.

In a second embodiment alone or in combination with the first embodiment, the metadata may include information associated with attendance of the user at the event.

In a third embodiment alone or in combination with any of the first through second embodiments, the metadata may include information associated with performance of the user at the event. For example, if the event is a competition, the metadata may include the user's placement in the competition, a time, score, and/or the like of the user in the competition, and/or the like.

In a fourth embodiment alone or in combination with any of the first through third embodiments, the metadata may include at least one of an image associated with the event, information identifying users associated with the event, information identifying entities associated with the event, or information identifying a location of the event.

In a fifth embodiment alone or in combination with any of the first through fourth embodiments, the metadata may include first information associated with a recognition of the user and second information associated with another user providing the recognition.

In a sixth embodiment alone or in combination with any of the first through fifth embodiments, the process flow 200 may include providing a digital platform for users to share information associated with electronic digital certificates, receiving, from the user device, permission to share the electronic digital certificate, and providing, via the digital platform, a display including at least a portion of the event information and at least a portion of the user information In a seventh embodiment alone or in combination with any of the first through sixth embodiments, the process flow 200 may include providing, via the digital platform, another display including information associated with a plurality of electronic digital certificates owned by the user.

In an eighth embodiment alone or in combination with any of the first through seventh embodiments, the event may be associated with an entity, and the smart contract may permit transfer of the electronic digital certificate to the entity.

In a ninth embodiment alone or in combination with any of the first through eighth embodiments, the process flow 200 may include receiving, from the user device, an instruction to transfer the electronic digital certificate to the entity and recording, on the distributed ledger and based on receiving the instruction, that the entity owns the electronic digital certificate.

In a tenth embodiment alone or in combination with any of the first through ninth embodiments, the smart contract may permit transfer of the electronic digital certificate to authorized users.

In an eleventh embodiment alone or in combination with any of the first through tenth embodiments, the process flow 300 may include receiving, from the user device, an instruction to transfer the electronic digital certificate to an authorized user of the authorized users, recording, on the distributed ledger and based on receiving the instruction, that the authorized user owns the electronic digital certificate, and providing, to another user device associated with the authorized user, another notification that the authorized user owns the electronic digital certificate.

In a twelfth embodiment alone or in combination with any of the first through eleventh embodiments, the event may be associated with an entity, and the smart contract may only permit transfer of the electronic digital certificate from the entity.

In a thirteenth embodiment alone or in combination with any of the first through twelfth embodiments, the smart contract may prevent all transfers of the electronic digital certificate.

Although FIG. 2 shows example blocks of process flow 200, in some embodiments, process flow 200 may include additional blocks, fewer blocks, different blocks, or differently arranged blocks than those depicted in FIG. 2. Additionally, or alternatively, two or more of the blocks of process flow 200 may be performed in parallel.

FIG. 3 illustrates a process flow 300 for providing a digital platform for users to share information associated with limited-transferability electronic digital certificates associated with events within a technical environment, in accordance with an embodiment of the invention. In some embodiments, an electronic digital certificate generating system and/or the like (e.g., similar to one or more of the systems described herein with respect to FIG. 1) may perform one or more of the steps of process flow 300.

As shown in block 302, the process flow 300 may include providing a digital platform for users to share information associated with electronic digital certificates. For example, an electronic digital certificate generating system may provide a digital platform for users to share information associated with electronic digital certificates. In some embodiments, the users may provide information associated with electronic digital certificates to a system hosting the digital platform. Additionally, or alternatively, the digital platform may include one or more user interfaces for receiving user input, displaying information associated with electronic digital certificates, changing information associated with electronic digital certificates, and/or the like.

As shown in block 304, the process flow 300 may include receiving, from a user device, permission to share electronic digital certificates. For example, an electronic digital certificate generating system may receive, from a user device, permission to share electronic digital certificates. In some embodiments, a user may manipulate, via a user device accessing the digital platform, one or more user interfaces on the digital platform to provide permission to share the electronic digital certificates. Additionally, or alternatively, the permission may be permission to share the electronic digital certificates privately (e.g., to a particular group, type, list, and/or the like of users) and/or publicly (e.g., to all users with access to the digital platform). In some embodiments, the permission may be permission to share a particular electronic digital certificate, a particular type of electronic digital certificate, a group of electronic digital certificates, all electronic digital certificates owned by the user, and/or the like.

As shown in block 306, the process flow 300 may include providing, via the digital platform, a display including event information and user information associated with the electronic digital certificates. For example, an electronic digital certificate generating system may provide, via the digital platform, a display including event information and user information associated with the electronic digital certificates. In some embodiments, the display may include event information and/or user information associated with electronic digital certificates for which the user provided permission to share and not event information and/or user information associated with electronic digital certificates for which the user did not provide permission to share.

Process flow 300 may include additional embodiments, such as any single embodiment or any combination of embodiments described herein and/or in connection with one or more other processes described elsewhere herein. Although FIG. 3 shows example blocks of process flow 300, in some embodiments, process flow 300 may include additional blocks, fewer blocks, different blocks, or differently arranged blocks than those depicted in FIG. 3. Additionally, or alternatively, two or more of the blocks of process flow 300 may be performed in parallel.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that may direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments may be configured without departing from the scope and spirit of the invention. Therefore, it is to be understood that, within the scope of the appended claims, the invention may be practiced other than as specifically described herein.

What is claimed is:

1. A system for automatic provisioning of limited-transferability electronic certificates associated with events, the system comprising:
at least one non-transitory storage device comprising computer-executable program code; and
at least one processing device coupled to the at least one non-transitory storage device, wherein the at least one processing device is configured to execute the computer-executable program code to:

receive event data comprising event information associated with an event, wherein the event information comprises a name of the event, an image associated with the event, a location of the event, and a sponsor of the event;

receive user data comprising user information associated with a user, wherein the user is associated with the event;

generate, using the name of the event, the image associated with the event, the location of the event, the sponsor of the event, and the user data, an electronic digital certificate;

store the electronic digital certificate on a distributed ledger;

generate, on the distributed ledger, a smart contract associated with the electronic digital certificate, wherein the smart contract allows transfer of the electronic digital certificate to an authorized user;

record, on the distributed ledger, that the user owns the electronic digital certificate; and provide, to a user device associated with the user, a notification that the user owns the electronic digital certificate.

2. The system of claim 1, wherein the at least one processing device is configured to execute the computer-executable program code to, when generating the electronic digital certificate, provide metadata in the electronic digital certificate, wherein the metadata is based on the event data and the user data.

3. The system of claim 2, wherein the metadata comprises information associated with attendance of the user at the event.

4. The system of claim 2, wherein the metadata comprises information associated with performance of the user at the event.

5. The system of claim 2, wherein the metadata comprises the image associated with the event, information identifying users associated with the event, information identifying entities associated with the event, and information identifying the location of the event.

6. The system of claim 2, wherein the metadata comprises first information associated with a recognition of the user and second information associated with another user providing the recognition.

7. The system of claim 1, wherein the at least one processing device is configured to execute the computer-executable program code to:

provide a digital platform for users to share information associated with electronic digital certificates;

receive, from the user device, permission to share the electronic digital certificate; and provide, via the digital platform, a display comprising at least a portion of the event information and at least a portion of the user information.

8. The system of claim 7, wherein the at least one processing device is configured to execute the computer-executable program code to provide, via the digital platform, another display comprising information associated with a plurality of electronic digital certificates owned by the user.

9. The system of claim 1, wherein the event is associated with an entity, and wherein the smart contract permits transfer of the electronic digital certificate to the entity, and wherein the entity initially provides the electronic digital certificate.

10. The system of claim 9, wherein the at least one processing device is configured to execute the computer-executable program code to:

receive, from the user device, an instruction to transfer the electronic digital certificate to the entity; and record, on the distributed ledger and based on receiving the instruction, that the entity owns the electronic digital certificate.

11. The system of claim 1, wherein the smart contract permits transfer of the electronic digital certificate to authorized users, and wherein the smart contract comprises terms identifying permissible transferors and terms identifying permissible transferees.

12. The system of claim 11, wherein the at least one processing device is configured to execute the computer-executable program code to:

receive, from the user device, an instruction to transfer the electronic digital certificate to an authorized user of the authorized users;

record, on the distributed ledger and based on receiving the instruction, that the authorized user owns the electronic digital certificate; and provide, to another user device associated with the authorized user, another notification that the authorized user owns the electronic digital certificate.

13. The system of claim 1, wherein the event is associated with an entity, and wherein the smart contract only permits transfer of the electronic digital certificate from the entity.

14. The system of claim 1, wherein the smart contract prevents all transfers of the electronic digital certificate.

15. A computer program product for automatic provisioning of limited-transferability electronic certificates associated with events, the computer program product comprising a non-transitory computer-readable medium comprising code causing a first apparatus to:

receive event data comprising event information associated with an event, wherein the event information comprises a name of the event, an image associated with the event, a location of the event, and a sponsor of the event;

receive user data comprising user information associated with a user, wherein the user is associated with the event;

generate, using the name of the event, the image associated with the event, the location of the event, the sponsor of the event, and the user data, an electronic digital certificate;

store the electronic digital certificate on a distributed ledger;

generate, on the distributed ledger, a smart contract associated with the electronic digital certificate, wherein the smart contract allows transfer of the electronic digital certificate to an authorized user;

record, on the distributed ledger, that the user owns the electronic digital certificate; and provide, to a user device associated with the user, a notification that the user owns the electronic digital certificate.

16. The computer program product of claim 15, wherein the non-transitory computer-readable medium comprises code causing the first apparatus to, when generating the electronic digital certificate, provide metadata in the electronic digital certificate, wherein the metadata is based on the event data and the user data.

17. The computer program product of claim 16, wherein the metadata comprises information associated with attendance of the user at the event.

18. The computer program product of claim 16, wherein the metadata comprises information associated with performance of the user at the event.

19. The computer program product of claim 16, wherein the metadata comprises the image associated with the event, information identifying users associated with the event, information identifying entities associated with the event, and information identifying the location of the event.

20. A method for automatic provisioning of limited-transferability electronic certificates associated with events, the method comprising:

receiving event data comprising event information associated with an event, wherein the event information comprises a name of the event, an image associated with the event, a location of the event, and a sponsor of the event;

receiving user data comprising user information associated with a user, wherein the user is associated with the event;

generating, using the name of the event, the image associated with the event, the location of the event, the sponsor of the event, and the user data, an electronic digital certificate;

storing the electronic digital certificate on a distributed ledger;

generating, on the distributed ledger, a smart contract associated with the electronic digital certificate, wherein the smart contract allows transfer of the electronic digital certificate to an authorized user;

recording, on the distributed ledger, that the user owns the electronic digital certificate; and providing, to a user device associated with the user, a notification that the user owns the electronic digital certificate.

\* \* \* \* \*